United States Patent
Eda et al.

(10) Patent No.: US 9,643,221 B2
(45) Date of Patent: May 9, 2017

(54) ULTRASONIC CLEANING METHOD AND APPARATUS

(75) Inventors: Yukio Eda, Shibukawa (JP); Toshiyuki Ibayashi, Shibukawa (JP); Hiroyuki Kurimura, Shibukawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 13/980,312

(22) PCT Filed: Jan. 17, 2012

(86) PCT No.: PCT/JP2012/050868
§ 371 (c)(1),
(2), (4) Date: Jul. 17, 2013

(87) PCT Pub. No.: WO2012/099126
PCT Pub. Date: Jul. 26, 2012

(65) Prior Publication Data
US 2013/0298941 A1    Nov. 14, 2013

(30) Foreign Application Priority Data

Jan. 18, 2011   (JP) .................................. 2011-007986

(51) Int. Cl.
*B08B 3/08* (2006.01)
*B08B 3/12* (2006.01)
*C03C 23/00* (2006.01)

(52) U.S. Cl.
CPC .................. *B08B 3/12* (2013.01); *B08B 3/08* (2013.01); *C03C 23/0075* (2013.01); *C03C 2218/328* (2013.01)

(58) Field of Classification Search
CPC  B08B 3/04; B08B 3/041; B08B 3/042; B08B 3/044; B08B 3/045; B08B 3/047;
(Continued)

(56) References Cited

U.S. PATENT DOCUMENTS 5,330,582 A * 7/1994 Chihara et al. ................ 134/40
5,443,747 A * 8/1995 Inada et al. ....................... 134/1
(Continued)

FOREIGN PATENT DOCUMENTS

CN    1333812 A    1/2002
CN    101286016 A  10/2008
(Continued)

OTHER PUBLICATIONS

European Search Report issued on Sep. 25, 2014, issued to the corresponding European Application No. 12736490.9.
(Continued)

*Primary Examiner* — David Cormier
(74) *Attorney, Agent, or Firm* — Stein IP, LLC

(57) ABSTRACT

There is provided an ultrasonic cleaning method capable of reliably cleaning to remove adhesive components even when the adhesive components adhere to a rigid substrate. The ultrasonic cleaning method comprises performing the following steps (1) to (5), in this order: (1) a step of immersing a rigid substrate having an adhesive adhering to a surface thereof in an aromatic alcohol-based cleaning liquid at 25 to 60° C.; (2) a step of cleaning off the adhesive on the rigid substrate by ultrasonic oscillation while keeping the state where the rigid substrate is immersed in the step (1); (3) a step of subsequently immersing the rigid substrate in a glycol ether-based cleaning liquid at 25 to 60° C.; (4) a step of rinsing off the aromatic alcohol-based cleaning liquid adhering to the rigid substrate by ultrasonic oscillation while keeping the state where the rigid substrate is immersed in the step (3); and (5) a step of subsequently rinsing off the glycol ether-based cleaning liquid and aromatic alcohol-based cleaning liquid adhering to the rigid substrate with water.

5 Claims, 1 Drawing Sheet

(58) Field of Classification Search
CPC .. B08B 3/048; B08B 3/06; B08B 3/08; B08B 3/10; B08B 3/102; B08B 3/104; B08B 3/106; B08B 3/108; B08B 3/12; B08B 3/123; B08B 3/126; B08B 2209/005; B08B 2220/00; B08B 2220/01; B08B 2220/02; B08B 2220/04
USPC ..................................... 134/84, 88, 89, 184
See application file for complete search history.

(56) References Cited

U.S. PATENT DOCUMENTS

| | | | |
|---|---|---|---|
| 6,140,286 A | 10/2000 | Watanabe et al. | |
| 7,052,556 B1* | 5/2006 | Montie | ............ B08B 3/08 134/26 |
| 7,435,711 B2* | 10/2008 | Hori et al. | ............... 510/175 |
| 2003/0168079 A1* | 9/2003 | Kabashima et al. | ............ 134/11 |
| 2008/0312118 A1* | 12/2008 | Futterer et al. | ............... 510/180 |

FOREIGN PATENT DOCUMENTS

| | | |
|---|---|---|
| EP | 0 032 179 A2 | 7/1981 |
| JP | 5-259144 A | 10/1993 |
| JP | 7-48599 A | 2/1995 |
| JP | 8-141527 A | 6/1996 |
| JP | 2001-276759 A | 10/2001 |
| JP | 2002-256295 A | 9/2002 |
| JP | 2004-189859 A | 7/2004 |
| JP | 2008-243342 A | 10/2008 |
| WO | WO 00/29535 A1 | 5/2000 |

OTHER PUBLICATIONS

International Search Report dated Mar. 5, 2012, issued in corresponding International Patent Application No. PCT/JP2012/050868.
International Preliminary Report on Patentability mailed Aug. 1, 2013, issued in corresponding International Patent Application No. PCT/JP2012/050868.

* cited by examiner

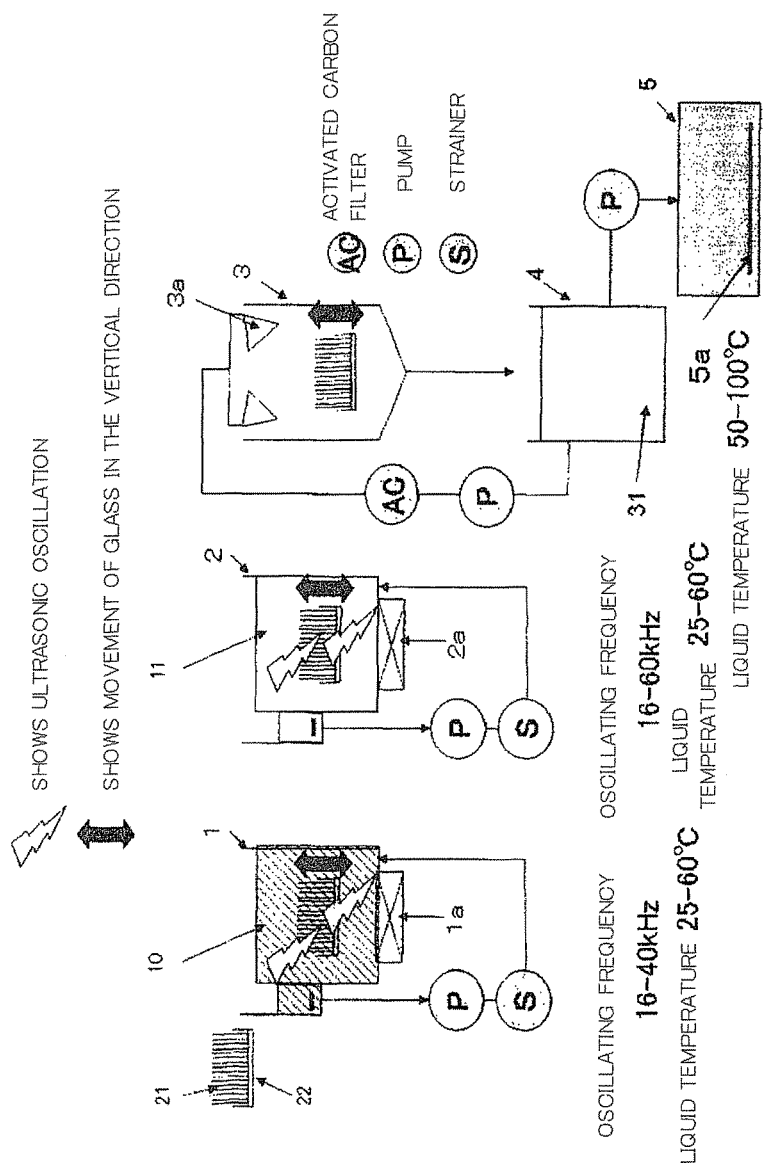

ULTRASONIC CLEANING METHOD AND APPARATUS

CROSS-REFERENCE TO RELATED APPLICATIONS

This application is a national stage application of PCT Application No. PCT/JP2012/050868, filed on Jan. 17, 2012, which claims the benefit of Japanese Application No. JP 2011-007986, filed Jan. 18, 2011, in the Japanese Intellectual Property Office, the disclosures of which are incorporated herein by reference.

BACKGROUND OF THE INVENTION

1. Field of the Invention

Aspects of the present invention relate to a method and apparatus for ultrasonic cleaning of a rigid substrate having an adhesive adhering to a surface thereof. The present invention particularly relates to a method and apparatus for ultrasonic cleaning off of a cured or uncured adhesive remaining on a rigid substrate after separating the rigid substrate laminate laminated with the adhesive.

2. Description of the Related Art

When a translucent rigid substrate of glass or the like is subjected to shape processing, glass in a sheet form has been cut and ground. However, a method of using an adhesive to laminate glass sheets into a multilayer laminate and collectively processing the laminate has been performed since the development of an adhesive for temporary fixing which allows the laminate to be separated by immersing it in hot water after bonding.

However, when air is mixed into the adhesive layer during the lamination and bonding, the UV light with which the adhesive is irradiated for curing decomposes and cleaves oxygen in the mixed air to generate oxygen radicals. The oxygen radicals inhibit the curing reaction of the adhesive, and the inhibited part remains uncured.

On the other hand, in the lamination of glass sheets, an ultraviolet-curable acrylic adhesive for temporary fixing is applied to glass sheets, which are stuck together and irradiated with UV light to thereby bond and laminate the glass sheets. When a printing pattern, a plating pattern, or the like through which UV light cannot easily transmit is applied to a glass surface, the degree of polymerization of the adhesive in the patterned part and adjacent parts thereof will be lower than that of the other parts, and the adhesive will be in an uncured state.

Generally, the adhesion of the adhesive to the glass is higher in the uncured part than in the cured part, and the adhesive components tend to remain on the glass in the subsequent step of separating the glass laminate and the adhesive to obtain glass sheets.

Moreover, even if the adhesive is in a cured state, the adhesive components may remain on the glass in the step of separating the laminated glass and the adhesive depending on the irradiance of the UV light applied for curing.

There is proposed a method of simultaneously oscillating at two different frequencies in a cleaning liquid stored in a cleaning tank in order to improve cleaning effectiveness (PTL 1). As the cleaning liquid, there are described a cleaning liquid mainly comprising a hydrocarbon-based solvent (hydrochloro=HC, hydrochlorofluorocarbon=HCFC) and a cleaning liquid mainly comprising an organic solvent (perfluorocarbon=PFC, hydrofluorocarbon=HFC).

There is proposed a cleaning method of immersion cleaning with a chemical solution followed by irradiation with ultrasonic waves in water (PTL 2). Further, it is stated that the chemical solution adhering to the surface of a substrate is scattered with heating. As the chemical solution, an acid or a mixed solution (POS) of sulfuric acid and aqueous hydrogen peroxide is described.

In order to enhance the cleaning effect, there is proposed a method of doubly arranging cleaning tanks to suppress uneven propagation of ultrasonic waves (PTL 3). There is stated that the cleaning liquid may be water or a cleaning liquid prepared by adding a surfactant to an acid or alkaline solution.

CITATION LIST

Patent Literature

[PTL 1] Japanese Patent Laid-Open No. 8-141527
[PTL 2] Japanese Patent Laid-Open No. 5-259144
[PTL 3] Japanese Patent Laid-Open No. 2008-243342

SUMMARY OF THE INVENTION

Technical Problem

The method of PTL 1 is a method of simultaneously oscillating at two different frequencies using a cleaning liquid mainly comprising a hydrocarbon-based solvent (hydrochloro=HC, hydrochlorofluorocarbon=HCFC) or a cleaning liquid mainly comprising an organic solvent (perfluorocarbon=PFC, hydrofluorocarbon=HFC). However, since a solvent having halogen(s) is used in this method, there is still room for an improvement in removing an adhesive remaining on glass, in terms of removal performance and environmental protection.

The method of PTL 2 is a method of immersion cleaning with a chemical solution followed by cleaning with ultrasonic waves, but this method does not include performing ultrasonic cleaning during the immersion cleaning with a chemical solution, and it cannot be said that the removal performance to the adhesive remaining on the glass is sufficient. Further, there is still room for an improvement in the cleaning liquid to be used.

The method of PTL 3 is a method of doubly arranging tanks to suppress uneven ultrasonic waves. The adhesive for temporary fixing under a printing pattern has a low degree of polymerization and is in a state with tackiness. When the adhesive for temporary fixing is used in PTL 3, the cleaning effect may be reduced by the damping of the ultrasonic wave itself because the adhesive has tackiness. In PTL 3, a flow from a direction different from the traveling direction of ultrasonic waves may cause a variation in receiving ultrasonic waves in a tank, and may cause uneven cleaning. Further, there is still room for an improvement in the cleaning liquid to be used.

Thus, in the cleaning methods described in PTLs 1 to 3, there is still room for an improvement for the purpose of removing the adhesive components remaining on glass.

Therefore, an object of the present invention is to provide a method of stably obtaining a high cleaning effect on the adhesive adhering to a rigid substrate of glass or the like. Preferably, a further object of the present invention is to provide a method of stably obtaining a high cleaning effect on the adhesive adhering to a rigid substrate of glass or the like while reducing the environmental load.

Solution to Problem

As a result of intensive studies to solve the above problems, the present inventors have found that an aromatic alcohol-based cleaning liquid is effective in removing the adhesive adhering to a rigid substrate. However, a problem is that the aromatic alcohol-based cleaning liquid has high BOD and COD of about 1,400,000 mg/kg and about 370,000 mg/kg, respectively, which makes it difficult to dilute and dispose of the cleaning liquid. Further, the amount of the rinse water (such as shower water) used when rinsing off the aromatic alcohol-based cleaning liquid from the rigid substrate is large, that is, 1,000 to 1,500 times the amount of the detergent, which makes it difficult to recover the rinse water.

Thus, after further studies, the present inventor has found that when cleaning the rigid substrate with an aromatic alcohol-based cleaning liquid, followed by rinsing off the aromatic alcohol-based cleaning liquid with a glycol ether-based cleaning liquid and further removing the cleaning liquid remaining on the rigid substrate with water, the amount of water to be used can be significantly reduced.

It has also been found that, by evaporating the recovered waste water, the cleaning liquid components can be recovered as a solid, and the burden of the waste water treatment can be significantly reduced.

That is, in one aspect, the present invention is an ultrasonic cleaning method comprising performing the following steps (1) to (5), in this order:
(1) a step of immersing a rigid substrate having an adhesive adhering to a surface thereof in an aromatic alcohol-based cleaning liquid at 25 to 60° C.;
(2) a step of cleaning off the adhesive on the rigid substrate by ultrasonic oscillation while keeping the state where the rigid substrate is immersed in the step (1);
(3) a step of subsequently immersing the rigid substrate in a glycol ether-based cleaning liquid at 25 to 60° C.;
(4) a step of rinsing off the aromatic alcohol-based cleaning liquid adhering to the rigid substrate by ultrasonic oscillation while keeping the state where the rigid substrate is immersed in the step (3); and
(5) a step of rinsing off the glycol ether-based cleaning liquid and aromatic alcohol-based cleaning liquid adhering to the rigid substrate with water.

In another aspect, the present invention is an ultrasonic cleaning method comprising performing the following steps (1) to (5), in this order:
(1) a step of immersing a rigid substrate obtained by separating a rigid substrate laminate bonded with a photocurable (meth)acrylic adhesive in an aromatic alcohol-based cleaning liquid at 25 to 60° C.;
(2) a step of cleaning to remove the adhesive on the rigid substrate by ultrasonic oscillation while keeping the state where the rigid substrate is immersed in the step (1);
(3) a step of subsequently immersing the rigid substrate in a glycol ether-based cleaning liquid at 25 to 60° C.;
(4) a step of rinsing off the aromatic alcohol-based cleaning liquid adhering to the rigid substrate by ultrasonic oscillation while keeping the state where the rigid substrate is immersed in the step (3); and
(5) a step of rinsing off the glycol ether-based cleaning liquid and aromatic alcohol-based cleaning liquid adhering to the rigid substrate with water.

In one embodiment of the ultrasonic cleaning method according to the present invention, the frequency of the ultrasonic waves for removing the adhesive in the step (2) is 20 kHz or more and 40 kHz or less.

In another embodiment of the ultrasonic cleaning method according to the present invention, the aromatic alcohol-based cleaning liquid contains an aromatic alcohol, water, and a surfactant, and the glycol ether cleaning liquid contains a glycol ether, water, and a surfactant.

In still another embodiment of the ultrasonic cleaning method according to the present invention, the aromatic alcohol is one or more selected from benzyl alcohol, phenethyl alcohol, hydrocinnamyl alcohol, and alkyl-substituted derivatives thereof, and the glycol ether is one or more selected from diethylene glycol monobutyl ether, diethylene glycol monomethyl ether, triethylene glycol monomethyl ether, propylene glycol monomethyl ether, and 3-methoxy-3-methyl-1-butanol.

In still another embodiment of the ultrasonic cleaning method according to the present invention, the step (5) is performed by spraying shower water on the rigid substrate.

In still another embodiment of the ultrasonic cleaning method according to the present invention, the frequency of the ultrasonic waves for removing the aromatic alcohol-based cleaning liquid in the step (4) is 16 kHz or more and 60 kHz or less.

In still another embodiment of the ultrasonic cleaning method according to the present invention, the waste water after the step (5) is heated to evaporate water to recover residual adhesive components and cleaning liquid components.

In still another embodiment of the ultrasonic cleaning method according to the present invention, the photocurable (meth)acrylic adhesive contains a polyfunctional (meth)acrylate (A), a monofunctional (meth)acrylate (B), and a photopolymerization initiator (C).

In still another embodiment of the ultrasonic cleaning method according to the present invention, the glycol ether-based cleaning liquid is one or more from the group consisting of a diethylene glycol monobutyl ether/polyoxyethylene alkyl ether/water system, a diethylene glycol monobutyl ether/polyoxyethylene alkyl ether/polyoxyethylene alkyl amine/water system, a diethylene glycol monobutyl ether/polyoxyethylene alkyl phenyl ether/water system, and a diethylene glycol monobutyl ether/polyoxyethylene alkyl phenyl ether/polyoxyethylene alkyl amine/water system.

In still another embodiment of the ultrasonic cleaning method according to the present invention, the aromatic alcohol-based cleaning liquid is a benzyl alcohol/water/sodium xylenesulfonate-based surfactant system.

In still another aspect, the present invention is an ultrasonic cleaning apparatus for performing the following steps (1) to (5), in this order:
(1) a step of immersing a rigid substrate obtained by separating a rigid substrate laminate bonded with a photocurable (meth)acrylic adhesive in an aromatic alcohol-based cleaning liquid at 25 to 60° C.;
(2) a step of cleaning to remove the adhesive on the rigid substrate by ultrasonic oscillation;
(3) a step of subsequently immersing the rigid substrate in a glycol ether-based cleaning liquid at 25 to 60° C.;
(4) a step of rinsing off the aromatic alcohol-based cleaning liquid adhering to the rigid substrate by ultrasonic oscillation; and
(5) a step of subsequently rinsing off the glycol ether-based cleaning liquid and aromatic alcohol-based cleaning liquid adhering to the rigid substrate with water.

In still another aspect, the present invention is an apparatus for cleaning a rigid substrate having an adhesive adhering to a surface thereof, the apparatus comprising:

a first cleaning liquid tank for cleaning a rigid substrate having an adhesive adhering to a surface thereof, the tank containing an aromatic alcohol-based cleaning liquid at 25 to 60° C. and being equipped with an ultrasonic oscillator;

a second cleaning liquid tank for rinsing off the aromatic alcohol-based cleaning liquid adhering to the rigid substrate, the tank being installed downstream of the first cleaning liquid tank, containing a glycol ether-based cleaning liquid at 25 to 60° C., and being equipped with an ultrasonic oscillator; and a water washing chamber for rinsing off the glycol ether-based cleaning liquid and aromatic alcohol-based cleaning liquid adhering to the rigid substrate with water, the chamber being installed downstream of the second cleaning liquid tank.

In one embodiment of the apparatus according to the present invention, the apparatus comprises an evaporator for evaporating water contained in a waste liquid from the water washing chamber.

In another embodiment of the apparatus according to the present invention, the apparatus comprises a storage tank for storing the waste liquid from the water washing chamber, the storage tank being installed between the water washing chamber and the evaporator.

In still another embodiment of the apparatus according to the present invention, the glycol ether-based cleaning liquid and aromatic alcohol-based cleaning liquid adhering to the rigid substrate are rinsed off with shower water.

In still another embodiment of the apparatus according to the present invention, the glycol ether-based cleaning liquid is one or more from the group consisting of a diethylene glycol monobutyl ether/polyoxyethylene alkyl ether/water system, a diethylene glycol monobutyl ether/polyoxyethylene alkyl ether/polyoxyethylene alkyl amine/water system, a diethylene glycol monobutyl ether/polyoxyethylene alkyl phenyl ether/water system, and a diethylene glycol monobutyl ether/polyoxyethylene alkyl phenyl ether/polyoxyethylene alkyl amine/water system.

In still another embodiment of the apparatus according to the present invention, the aromatic alcohol-based cleaning liquid is a benzyl alcohol/water/sodium xylenesulfonate-based surfactant system.

Effects of Invention

According to the ultrasonic cleaning method of the present invention, in the case where rigid substrates are laminated with an adhesive and collectively processed and then the laminated glass is separated, even when the adhesive components remain on the rigid substrates, the adhesive remaining on the rigid substrate can be cleaned with high cleaning efficiency, preferably can be cleaned while reducing the load of drainage treatment.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

The Figure is a schematic view showing an embodiment of the ultrasonic cleaning apparatus of the present invention.

DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the Figure.

Hereinafter, the best mode of the ultrasonic cleaning method according to the present invention will be described with reference to the drawing.

The rigid substrate to be treated by the present invention is a rigid substrate having an adhesive adhering to a surface thereof. The rigid substrate is not particularly limited as long as it is a rigid substrate having an adhesive adhering to a surface thereof, but typically, the rigid substrate to be treated by the present invention is a rigid substrate obtained by separating a rigid substrate laminate bonded with an adhesive.

Examples of the rigid substrate include a translucent rigid substrate and a rigid substrate which is not translucent. The translucent rigid substrate is preferred in that it can be cured by light. The translucent rigid substrate is not particularly limited, and examples thereof include plate glass (such as raw plate glass, a glass substrate with a transparent conductive film, and a glass substrate on which an electrode and a circuit are formed), a sapphire substrate, a quartz substrate, a plastic substrate, and a magnesium fluoride substrate. The glass also includes tempered glass. The size of the translucent rigid substrate is not particularly limited, but typically, the substrate has an area of about 10000 to 250000 mm$^2$ and a thickness of about 0.1 to 2 mm. Each rigid substrate generally has the same size. Although not limited, a predetermined printing pattern or a plating pattern for exerting one of the functions of plate-shaped products can be applied to a surface of each rigid substrate. Examples of the printing pattern include a design of a display screen of cellular phones, and examples of the plating pattern include a rotary encoder to which a chrome plating pattern is applied.

An adhesive is applied to a surface of the rigid substrate. The adhesive may be applied to a bonding surface of one of the rigid substrates, but in terms of improving adhesion, it is preferred to apply the adhesive to the bonding surfaces of both rigid substrates.

Examples of the adhesives suitably used in the present invention include an acrylic adhesive, an epoxy adhesive, a urethane adhesive, a polyester adhesive, a silicon adhesive, a polyimide adhesive, an ene-thiol adhesive, a hot melt adhesive such as olefin, a cyanoacrylate adhesive, a modified silicon adhesive, and a fluorine-based adhesive. Among these, an acrylic adhesive and/or an epoxy adhesive is preferred, and an acrylic adhesive is more preferred, from the viewpoint that it is excellent in heat resistance, moisture resistance, and light resistance and has a high cleaning effect.

Examples of the acrylic adhesive include a heat-curable acrylic adhesive, a photocurable acrylic adhesive, and a room temperature-curable acrylic adhesive. Examples of the epoxy adhesive include a two-part curable epoxy adhesive, a one-part heat-curable epoxy adhesive, and an ultraviolet-curable epoxy adhesive. Among these, an acrylic adhesive is preferred from the viewpoint that it has a large effect. Among the acrylic adhesives, a photocurable acrylic adhesive and/or a room temperature-curable acrylic adhesive is preferred from the viewpoint that it has a large effect.

When a translucent rigid substrate is used, a photocurable adhesive is preferred as the adhesive suitably used in the present invention. The photocurable adhesive is an adhesive which is cured, for example, by being irradiated with light such as ultraviolet rays, and the cured adhesive is softened when it is heated to high temperatures.

<Photocurable Acrylic Adhesive>

Examples of the photocurable adhesive include a photocurable (meth)acrylic adhesive. Examples of the photocurable (meth)acrylic adhesive include an adhesive composition containing a polyfunctional (meth)acrylate (A), a monofunctional (meth)acrylate (B), and a photopolymerization initiator (C), such as those described in WO 2008/018252.

As the polyfunctional (meth)acrylate (A), a polyfunctional (meth)acrylate oligomer/polymer having two or more (meth)acryloylated oligomer/polymer terminals or side chains and a polyfunctional (meth)acrylate monomer having two or more (meth)acryloyl groups can be used. Examples of the polyfunctional (meth)acrylate oligomer/polymer include 1,2-polybutadiene-terminated urethane (meth)acrylate (for example, "TE-2000" and "TEA-1000" manufactured by Nippon Soda Co., Ltd.), a hydrogenated product thereof (for example, "TEAI-1000" manufactured by Nippon Soda Co., Ltd.), 1,4-polybutadiene-terminated urethane (meth)acrylate (for example, "BAC-45" manufactured by Osaka Organic Chemical Industry Ltd.), polyisoprene-terminated (meth)acrylate, polyester-based urethane (meth)acrylate (for example, "UV-2000B" and "UV-3000B" manufactured by The Nippon Synthetic Chemical Industry Co., Ltd., "UV-7000B" manufactured by The Nippon Synthetic Chemical Industry Co., Ltd., and "KHP-11" and "KHP-17" manufactured by Negami Chemical Industrial Co., Ltd.), polyether-based urethane (meth)acrylate (for example, "UV-3700B" and "UV-6100B" manufactured by The Nippon Synthetic Chemical Industry Co., Ltd.), and bisphenol A type epoxy(meth)acrylate.

Here, the urethane (meth)acrylate refers to a urethane (meth)acrylate obtained by reacting a polyol compound (hereinafter represented by X), an organic polyisocyanate compound (hereinafter represented by Y), and hydroxy (meth)acrylate (hereinafter represented by Z).

Examples of the polyol compound (X) include polyhydric alcohols such as ethylene glycol, diethylene glycol, triethylene glycol, tetraethylene glycol, polyethylene glycol, propylene glycol, dipropylene glycol, polypropylene glycol, butylene glycol, 1,4-butanediol, polybutylene glycol, 1,5-pentanediol, 1,6-hexanediol, 1,8-octanediol, 1,9-nonanediol, 3-methyl-1,5-pentanediol, 2,4-diethyl-1,5-pentanediol, 2,2-butylethyl-1,3-propanediol, neopentyl glycol, cyclohexanedimethanol, hydrogenated bisphenol A, polycaprolactone, trimethylolethane, trimethylolpropane, polytrimethylolpropane, pentaerythritol, polypentaerythritol, sorbitol, mannitol, glycerin, polyglycerin, and polytetramethylene glycol; polyether polyols having at least one structure of a block or random copolymer of polyethylene oxide, polypropylene oxide, and ethylene oxide/propylene oxide; polyester polyols which are condensates of these polyhydric alcohols or polyether polyols and polybasic acids such as maleic acid anhydride, maleic acid, fumaric acid, itaconic acid anhydride, itaconic acid, adipic acid, and isophthalic acid; caprolactone-modified polyols such as caprolactone-modified polytetramethylene polyol; polyolefin-based polyols; polycarbonate-based polyols; polydiene-based polyols such as polybutadiene polyol, polyisoprene polyol, hydrogenated polybutadiene polyol, and hydrogenated polyisoprene polyol; and silicone polyols such as polydimethylsiloxane polyol. Among these, polyether polyols and/or polyester polyols are more preferred.

Examples of the organic polyisocyanate compounds (Y) which can be used include, but are not particularly limited to, aromatic, aliphatic, cycloaliphatic, and alicyclic polyisocyanates. Especially, suitably used are polyisocyanates such as tolylene diisocyanate (TDI), diphenylmethane diisocyanate (MDI), hydrogenated diphenylmethane diisocyanate (H-MDI), polyphenylmethane polyisocyanate (crude MDI), modified diphenylmethane diisocyanate (modified MDI), hydrogenated xylylene diisocyanate (H-XDI), xylylene diisocyanate (XDI), hexamethylene diisocyanate (HMDI), trimethyl hexamethylene diisocyanate (TMXDI), tetramethyl xylylene diisocyanate (m-TMXDI), isophorone diisocyanate (IPDI), norbornene diisocyanate (NBDI), and 1,3-bis(isocyanatomethyl)cyclohexane (H6XDI), or trimer compounds of these polyisocyanates and reaction products of these polyisocyanates and polyols. Among these, hydrogenated xylylene diisocyanate (H-XDI) and/or isophorone diisocyanate (IPDI) is preferred.

Examples of the hydroxy(meth)acrylate (Z) include 2-hydroxyethyl(meth)acrylate, 2-hydroxypropyl(meth)acrylate, 2-hydroxybutyl(meth)acrylate, 2-hydroxyethyl acryloyl phosphate, 4-butylhydroxy(meth)acrylate, 2-(meth)phthalate, glycerin di(meth)acrylate, 2-hydroxy-3-acryloyloxy-propyl(meth)acrylate, caprolactone-modified 2-hydroxyethyl(meth)acrylate, pentaerythritol tri(meth)acrylate, dipentaerythritol penta(meth)acrylate, and caprolactone-modified 2-hydroxyethyl(meth)acrylate. Among these, one or more from the group consisting of 2-hydroxyethyl(meth)acrylate, 2-hydroxypropyl(meth)acrylate, and 2-hydroxybutyl(meth)acrylate are preferred.

Among these, polyester-based urethane (meth)acrylate and/or polyether-based urethane (meth)acrylate are preferred, and polyester-based urethane (meth)acrylate is more preferred, from the viewpoint that it has a large effect.

The weight average molecular weight of the polyfunctional (meth)acrylate oligomer/polymer is preferably 7000 to 60000, more preferably 13000 to 40000. In Examples, the weight average molecular weight was determined by preparing a calibration curve with a commercially available standard polystyrene using a GPC system (SC-8010 manufactured by Tosoh Corporation) using tetrahydrofuran as a solvent, under the following conditions.

Flow rate: 1.0 ml/min
Preset temperature: 40° C.
Column configuration: one piece of "TSK guard column MP (xL)" 6.0 mm ID×4.0 cm, manufactured by Tosoh Corporation and two pieces of "TSK-GEL MULTIPORE HXL-M" 7.8 mm ID×30.0 cm, manufactured by Tosoh Corporation (number of theoretical plates: 16,000 plates), three pieces in total (total number of theoretical plates: 32,000 plates)
Amount of sample injection: 100 μl (concentration of sample solution: 1 mg/ml)
Liquid sending pressure: 39 kg/cm$^2$
Detector: RI detector Examples of the bifunctional (meth)acrylate monomer include 1,3-butyleneglycol di(meth)acrylate, 1,4-butanediol di(meth)acrylate, 1,6-hexanediol di(meth)acrylate, 1,9-nonanediol di(meth)acrylate, neopentylglycol di(meth)acrylate, dicyclopentanyl di(meth)acrylate, 2-ethyl-2-butyl-propanediol di(meth)acrylate, neopentylglycol-modified trimethylolpropane di(meth)acrylate, stearic acid-modified pentaerythritol di(meth)acrylate, polypropyleneglycol di(meth)acrylate, 2,2-bis(4-(meth)acryloxydiethoxyphenyl) propane, 2,2-bis(4-(meth)acryloxypropoxyphenyl)propane, and 2,2-bis(4-(meth)acryloxytetraethoxyphenyl)propane. Among these, 1,6-hexanediol di(meth)acrylate and/or dicyclopentanyl di(meth)acrylate is preferred, and dicyclopentanyl di(meth)acrylate is more preferred, from the viewpoint that it has a large effect.

Examples of the trifunctional (meth)acrylate monomer include trimethylolpropane tri(meth)acrylate and tris[(meth)acryloyloxyethyl]isocyanurate.

Examples of the tetra- or more functional (meth)acrylate monomer include dimethylolpropane tetra(meth)acrylate, pentaerythritol tetra(meth)acrylate, pentaerythritolethoxy tetra(meth)acrylate, dipentaerythritol penta(meth)acrylate, and dipentaerythritol hexa(meth)acrylate.

Among the polyfunctional (meth)acrylate, a polyfunctional (meth)acrylate oligomer/polymer and/or a bifunctional (meth)acrylate monomer is preferably contained from the viewpoint that it has a large effect, and a polyfunctional (meth)acrylate oligomer/polymer is more preferably used in combination with a bifunctional (meth)acrylate monomer.

With respect to the content ratio when the polyfunctional (meth)acrylate oligomer/polymer is used in combination with the bifunctional (meth)acrylate monomer, the ratio of the polyfunctional (meth)acrylate oligomer/polymer to the bifunctional (meth)acrylate monomer by mass is preferably 10-90:90-10, more preferably 25-75:75-25, most preferably 30-70:70-30, based on 100 parts by mass of the total of the polyfunctional (meth)acrylate oligomer/polymer and the bifunctional (meth)acrylate monomer.

Examples of the monofunctional (meth)acrylate monomer (B) having one (meth)acryloyl group include methyl(meth)acrylate, ethyl(meth)acrylate, propyl(meth)acrylate, butyl(meth)acrylate, 2-ethylhexyl(meth)acrylate, isooctyl(meth)acrylate, isodecyl(meth)acrylate, lauryl(meth)acrylate, stearyl(meth)acrylate, phenyl(meth)acrylate, cyclohexyl(meth)acrylate, dicyclopentanyl(meth)acrylate, dicyclopentenyl(meth)acrylate, dicyclopentenyloxyethyl(meth)acrylate, isobornyl(meth)acrylate, methoxylated cyclodecatriene (meth)acrylate, 2-hydroxyethyl(meth)acrylate, 2-hydroxypropyl(meth)acrylate, 3-hydroxypropyl(meth)acrylate, 4-hydroxybutyl(meth)acrylate, tetrahydrofurfuryl(meth)acrylate, 2-hydroxy-3-phenoxypropyl(meth)acrylate, glycidyl(meth)acrylate, caprolactone-modified tetrahydrofurfuryl(meth)acrylate, 3-chloro-2-hydroxypropyl(meth)acrylate, N,N-dimethylaminoethyl(meth)acrylate, N,N-diethylaminoethyl(meth)acrylate, t-butylaminoethyl(meth)acrylate, ethoxycarbonylmethyl(meth)acrylate, phenyl ethylene oxide-modified (meth)acrylate, phenol(2-mol ethylene oxide-modified)(meth)acrylate, phenol(4-mol ethylene oxide-modified)(meth)acrylate, paracumylphenol ethylene oxide-modified (meth)acrylate, nonylphenol ethylene oxide-modified (meth)acrylate, nonylphenol(4-mol ethylene oxide-modified)(meth)acrylate, nonylphenol(8-mol ethylene oxide-modified)(meth)acrylate, nonylphenol(2.5-mol propylene oxide-modified)(meth)acrylate, 2-ethylhexyl carbitol(meth)acrylate, ethylene oxide-modified phthalic acid (meth)acrylate, ethylene oxide-modified succinic acid (meth)acrylate, trifluoroethyl(meth)acrylate, acrylic acid, methacrylic acid, ω-carboxy-polycaprolactone mono(meth)acrylate, phthalic acid monohydroxyethyl(meth)acrylate, (meth)acrylic acid dimer, β-(meth)acryloyloxyethyl hydrogen succinate, n-(meth)acryloyloxyalkyl hexahydrophthalimide, 2-(1,2-cyclohexacarboxylmide)ethyl(meth)acrylate, ethoxydiethylene glycol(meth)acrylate, and benzyl(meth)acrylate.

Among the monofunctional (meth)acrylate, one or more from the group consisting of phenol 2-mol ethylene oxide-modified (meth)acrylate, 2-(1,2-cyclohexacarboxylmide)ethyl(meth)acrylate, and 2-hydroxy-3-phenoxypropyl(meth)acrylate are preferred from the viewpoint that they have a large effect. Phenol 2-mol ethylene oxide-modified (meth)acrylate is more preferably used in combination with 2-(1,2-cyclohexacarboxylmide)ethyl(meth)acrylate and/or 2-hydroxy-3-phenoxypropyl(meth)acrylate.

With respect to the content ratio when phenol 2-mol ethylene oxide-modified (meth)acrylate is used in combination with 2-(1,2-cyclohexacarboxylmide)ethyl(meth)acrylate and/or 2-hydroxy-3-phenoxypropyl(meth)acrylate, the ratio of the phenol 2-mol ethylene oxide-modified (meth)acrylate to the 2-(1,2-cyclohexacarboxylmide)ethyl(meth)acrylate and/or 2-hydroxy-3-phenoxypropyl(meth)acrylate by mass is preferably 5-80:95-20, more preferably 15-60:85-40, most preferably 20-45:80-55, based on 100 parts by mass of the total of the phenol 2-mol ethylene oxide-modified (meth)acrylate, 2-(1,2-cyclohexacarboxylmide)ethyl(meth)acrylate, and 2-hydroxy-3-phenoxypropyl(meth)acrylate.

The compounding ratio of the polyfunctional (meth)acrylate (A) to the monofunctional (meth)acrylate (B), (A):(B), is preferably 5:95 to 95:5 (parts by mass). When it is 5 parts by mass or more, there will be no possibility of reduction in the initial adhesion, and when it is 95 parts by mass or less, the peelability can be secured. The cured adhesive is separated in a film form by being immersed in hot water. The content of the monofunctional (meth)acrylate (B) is more preferably 40 to 80 parts by mass based on 100 parts by mass of the total amount of (A) and (B).

The photopolymerization initiator (C) is blended in order to sensitize a resin composition with the active rays such as visible light or ultraviolet rays to promote the photocuring thereof, and various known photopolymerization initiators can be used. Specific examples thereof include benzophenone or derivatives thereof; benzil or derivatives thereof; anthraquinone or derivative thereof; benzoin; benzoin derivatives such as benzoin methyl ether, benzoin ethyl ether, benzoin propyl ether, benzoin isobutyl ether, and benzyl dimethyl ketal; acetophenone derivatives such as diethoxyacetophenone and 4-t-butyl trichloroacetophenone; 2-dimethylamino ethyl benzoate; p-dimethylamino ethyl benzoate; diphenyl disulfide; thioxanthone or derivatives thereof; camphorquinone; camphorquinone derivatives such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromoethylester, 7,7-dimethyl-2,3-dioxobicyclo[2.2.1]heptane-1-carboxy-2-methylester, and 7,7-dimethyl-2,3-dioxobicyclo[2.2.1]heptane-1-carboxylic acid chloride; α-aminoalkylphenone derivatives such as 2-methyl-1-[4-(methylthio)phenyl]-2-morpholinopropan-1-one and 2-benzyl-2-dimethylamino-1-(4-morpholinophenyl)-butanone-1; acylphosphine oxide derivatives such as benzoyl diphenylphosphine oxide, 2,4,6-trimethylbenzoyl diphenylphosphine oxide, benzoyl diethoxyphosphine oxide, 2,4,6-trimethylbenzoyl dimethoxyphenyl phosphine oxide, and 2,4,6-trimethylbenzoyl diethoxyphenyl phosphine oxide, oxy-phenyl-acetic acid 2-[2-oxo-2-phenyl-acetoxy-ethoxy]-ethyl ester and/or oxy-phenyl-acetic acid 2-[2-hydroxy-ethoxy]-ethyl ester. The photopolymerization initiator can be used singly or in combinations of two or more. Among these, one or two or more from the group consisting of benzyl dimethyl ketal, oxy-phenyl-acetic acid 2-[2-oxo-2-phenyl-acetoxy-ethoxy]-ethyl ester, and oxy-phenyl-acetic acid 2-[2-hydroxy-ethoxy]-ethyl ester are preferred from the viewpoint that they have a large effect.

The content of the photopolymerization initiator (C) is preferably 0.1 to 20 parts by mass, more preferably 0.5 to 10 parts by mass, relative to 100 parts by mass of the total of (A) and (B). When it is 0.1 parts by mass or more, the effect of acceleration of curing is reliably obtained, and when it is 20 parts by mass or less, sufficient cure rate can be obtained. The addition of the component (C) in an amount of 1 part by mass or more is further preferred from the viewpoint that the curing is possible irrespective of the amount of light irradiation; the degree of crosslinking of the cured product of the composition is increased; the displacement of a position or the like does not occur during cutting; and the peelability is improved.

The photocurable adhesive preferably contains particulate matter (D) which does not dissolve in the components (A), (B), and (C). Since the particulate matter (D) allows a predetermined thickness of the composition after curing to be kept, the processing accuracy is improved. Further, since the cured product of the adhesive composition has a coefficient of linear expansion different from that of the particulate matter (D), the peelability at the time of separating translucent rigid substrates after they are stuck together with the adhesive composition is improved.

The material of the particulate matter (D) may be generally used organic particles or inorganic particles. Specific examples of the organic particles include polyethylene particles, polypropylene particles, crosslinked polymethyl methacrylate particles, and crosslinked polystyrene particles. Specific examples of the inorganic particles include particles of ceramics such as glass, silica, alumina, and titanium.

The particulate matter (D) is preferably spherical in terms of improving processing accuracy, that is, controlling the thickness of the adhesive. The average particle size of the particulate matter (D) determined by a laser method is preferably in the range of 20 to 200 μm. When the average particle size of the particulate matter is 20 μm or more, the resulting adhesive will be excellent in peelability, and when it is 200 μm or less, the resulting adhesive will be excellent in dimensional accuracy because displacement will hardly occur during the processing of the temporarily fixed member. The average particle size (D50) is more preferably 35 to 150 μm, further preferably 50 to 120 μm, in terms of peelability and dimensional accuracy. The particle size distribution is measured with a laser diffraction type particle size distribution measuring device.

The amount of the particulate matter (D) used is preferably 0.01 to 20 parts by mass, more preferably 0.05 to 10 parts by mass, most preferably 0.1 to 6 parts by mass, relative to 100 parts by mass of the total amount of (A) and (B), in terms of adhesion, processing accuracy, and peelability.

A polymerization inhibitor (E) can be added to the photocurable adhesive for improving storage stability. Examples of the polymerization inhibitor include methylhydroquinone, hydroquinone, 2,2-methylene-bis(4-methyl-6-tertiary-butylphenol), catechol, hydroquinone monomethyl ether, monotertiary butyl hydroquinone, 2,5-ditertiary butyl hydroquinone, p-benzoquinone, 2,5-diphenyl-p-benzoquinone, 2,5-ditertiary butyl-p-benzoquinone, picric acid, citric acid, phenothiazine, tertiary butyl catechol, 2-butyl-4-hydroxyanisole, and 2,6-ditertiary butyl-p-cresol.

The amount of the polymerization inhibitor (E) used is preferably 0.001 to 3 parts by mass, more preferably 0.01 to 2 parts by mass, relative to 100 parts by mass of the total amount of (A) and (B). When it is 0.001 parts by mass or more, the storage stability will be ensured, and when it is 3 parts by mass or less, good adhesion will be obtained, and the resulting adhesive will not remain uncured.

The wavelength of the light with which the adhesive is irradiated may be suitably changed depending on the characteristics of the adhesive to be used, and the adhesive can be irradiated, for example, with microwave, infrared rays, visible light, ultraviolet rays, X-rays, γ-rays, and electron beams. The irradiation light is generally ultraviolet rays because they can be easily used and have relatively high energy. Thus, in the present invention, the light refers not only to visible light but to the electromagnetic waves (energy rays) including a wide wavelength region.

The amount of irradiating light is generally 10 to 5,000 $mJ/cm^2$, typically 30 to 3,000 $mJ/cm^2$, more typically 100 to 2,500 $mJ/cm^2$, and preferably 300 to 2,000 $mJ/cm^2$, as measured with an integrated illuminance meter using a 365-nm photodetector. The irradiation time is generally about 0.1 to 200 seconds, typically about 0.1 to 30 seconds, more typically about 0.1 to 20 seconds.

<Room Temperature-Curable Acrylic Adhesive>

A room temperature-curable acrylic adhesive preferably contains (meth)acrylate (A), a radical polymerization initiator (B), and a decomposition accelerator (C).

Examples of the (meth)acrylate include polyfunctional (meth)acrylate and monofunctional (meth)acrylate.

Examples of the radical polymerization initiator (B) include an organic peroxide.

The decomposition accelerator (C) preferably reacts with the radical polymerization initiator at ordinary temperature to generate radicals. Examples of the decomposition accelerator include tertiary amines, thiourea derivatives, and metal salts.

The room temperature-curable acrylic adhesive is preferably used as a two-part room temperature-curable acrylic adhesive. An embodiment of the two-part room temperature-curable acrylic adhesive includes using it as a two-part type adhesive. With respect to the two-part type, all the essential ingredients of the adhesive of the present invention are not mixed together during storage, but the adhesive is divided into A-part and B-part, and the radical polymerization initiator and the decomposition accelerator are separately stored, wherein at least the radical polymerization initiator is stored in the A-part, and at least the decomposition accelerator is stored in the B-part. In this case, the adhesive can be used as a two-part room temperature-curable acrylic adhesive by simultaneously or separately applying both the parts to an adherend, followed by bringing them into contact with each other for curing.

<Two-Part Curable Epoxy Adhesive>

The two-part curable epoxy adhesive is divided into A-part and B-part, and a base resin and a curing agent are separately stored, wherein at least the base resin is stored in the A-part, and at least the curing agent is stored in the B-part. In this case, the adhesive can be used as a two-part curable epoxy adhesive by simultaneously or separately applying both the parts to an adherend, followed by bringing them into contact with each other for curing.

Examples of the epoxy resin used in the two-part curable epoxy adhesive include an aromatic epoxy resin, an aliphatic epoxy resin, and a cycloaliphatic epoxy resin.

The curing agent is a component capable of curing the epoxy resin. Examples of the curing agent include an amine compound, a mercaptan compound, and an acid anhydride.

It is preferred to laminate a plurality of translucent rigid substrates, in terms of the improvement in production efficiency of plate-shaped products. It is desirable to manufacture a translucent rigid substrate laminate in which 10 or more translucent rigid substrates, typically 8 to 30 translucent rigid substrates, are laminated, in terms of the improvement in production efficiency of plate-shaped products.

Next, the translucent rigid substrate laminate is divided in the thickness direction to form a desired number of divided translucent rigid substrate laminates. The dividing method includes, but is not particularly limited to, a method of using, either singly or in combination, a disk cutter (a diamond disk, a super hard alloy disk), a bonded abrasive grain-type or a free abrasive grain-type wire saw, a laser beam, a water jet, etching (examples: chemical etching using fluoric acid, sulfuric acid, or the like and electrolytic etching), and a red heat band (nichrome wire) to divide the laminate into a rectangular parallelepiped shape of the same size. The etching can also be used for the surface treatment of the cut surfaces after they are divided.

A desired shape processing may be applied to each divided translucent rigid substrate laminate.

The divided translucent rigid substrate laminates are heated to thereby separate the translucent rigid substrates stuck together to form a plurality of plate-shaped products. Although the heating method is not particularly limited, a method of immersing the translucent rigid substrate laminate after shape processing in hot water is preferred because the adhesive is softened in a film form to successfully separate to form each plate-shaped product. Although suitable hot water temperature is depending on the adhesive to be employed, it is usually 60 to 95° C., preferably 80 to 90° C.

The Figure is a schematic view showing an example of the ultrasonic cleaning apparatus of the present invention.

This embodiment is illustrated in the Figure. This embodiment comprises an ultrasonic cleaning tank 1 containing an aromatic alcohol-based cleaning liquid, an ultrasonic cleaning tank 2 containing a glycol ether-based cleaning liquid, a shower cleaning tank 3 for rinsing off and removing the cleaning liquid with water, a storage tank 4 for temporarily recovering waste shower water, and an evaporator 5 for evaporating the waste shower water. In the present invention, the waste water is recovered while cleaning to remove the adhesive which is present on a rigid substrate, and then the water in the waste water is evaporated to thereby recover the components of the cleaning liquid and the adhesive as solids.

<1. Ultrasonic Cleaning Tank 1 and Ultrasonic Cleaning Tank 2>

The ultrasonic cleaning apparatus of the present invention has the ultrasonic cleaning tank 1 storing an aromatic alcohol-based cleaning liquid 10 for removing the adhesive components on a rigid substrate and the ultrasonic cleaning tank 2 storing a glycol ether-based cleaning liquid 11 for removing and recovering the aromatic alcohol-based cleaning liquid 10 adhering mainly to the rigid substrate.

When cleaning the rigid substrate, a containing shelf 22 may be used in which a plurality of rigid substrates 21 are aligned at equal intervals and stored.

<2. Shower Cleaning Tank 3, Storage Tank 4, and Evaporator 5>

The ultrasonic cleaning apparatus of the present invention has the shower cleaning tank 3 for flushing the glycol ether-based cleaning liquid adhering to the rigid substrate with water, the storage tank 4 for temporarily recovering and storing shower water, and the evaporator 5.

<Ultrasonic Cleaning Tank 1>

Because of the necessity to separate the adhesive components bonded to glass, the ultrasonic oscillating frequency of the ultrasonic cleaning tank 1 is preferably 16 kHz or more and 40 kHz or less, more preferably 20 kHz or more and 40 kHz or less, which is the frequency range with higher capability to start cavitation. The cleaning liquid temperature of the ultrasonic cleaning tank 1 is preferably 25° C. or more and 60° C. or less, preferably 35° C. or more and 50° C. or less, which is the temperature range in which the liquid temperature change by the adjustment of the concentration of the cleaning liquid is little, and the temperature can be controlled.

An ultrasonic oscillator 1a is installed in the bottom of the ultrasonic cleaning tank 1. The ultrasonic oscillator 1a may be installed in the side part of the ultrasonic cleaning tank 1.

<Ultrasonic Cleaning Tank 2>

Due to the same reason as in the case of the upstream tank, the ultrasonic oscillating frequency of the ultrasonic cleaning tank 2 is preferably 16 kHz or more and 60 kHz or less, more preferably 20 kHz or more and 40 kHz or less, in order to remove unpeeled residue swelled by the treatment in the upstream tank and the cleaning liquid of the upstream tank. The cleaning liquid temperature of the ultrasonic cleaning tank 2 is preferably 25° C. or more and 60° C. or less, preferably 35° C. or more and 50° C. or less, which is the temperature range in which the liquid temperature change by the adjustment of the concentration of the cleaning liquid is little, and the temperature can be controlled.

An ultrasonic oscillator 2a is installed in the bottom of the ultrasonic cleaning tank 2. The ultrasonic oscillator 2a may be installed in the side part of the ultrasonic cleaning tank 2.

When oscillating ultrasonic waves in the ultrasonic cleaning tank 1 or the ultrasonic cleaning tank 2, the tanks may comprise a mechanism of changing the amplitude of ultrasonic waves to adjust cleaning efficiency, a mechanism of changing the oscillating frequency itself to thereby uniformly develop cleaning effect, and a mechanism of shaking glass to thereby uniformly develop cleaning effect. For example, ultrasonic waves can be oscillated while shaking the containing shelf 22 storing the glass.

<Shower Cleaning Tank 3 and Storage Tank 4>

Shower water is injected from a shower 3a of the shower cleaning tank 3 to the rigid substrate laminate, and the glycol ether-based cleaning liquid and aromatic alcohol-based cleaning liquid adhering to the rigid substrate are flushed with water. If the shower water can be injected to the rigid substrate laminate, it is not necessary to install the shower cleaning tank 3. Further, it is not necessary to limit to a shower as long as water which can rinse the cleaning liquid is available, and the cleaning liquid may be flushed by a method of immersing the rigid substrate laminate in a water tank, applying running water to the rigid substrate laminate, or the like. However, for the purpose of washing out cleaner having high BOD and COD and in terms of recovering and evaporating the cleaning liquid, shower water is preferred because cost increases due to the problem of the amount to be treated.

The waste shower water after washing out the cleaning liquid in the shower cleaning tank 3 is recovered, temporarily stored in the storage tank 4, and successively sent to the evaporator 5.

<Evaporator 5>

Waste shower water 31 sent to the evaporator 5 is heated. The evaporator 5 may have a multistage tray structure so as to improve evaporation efficiency of the waste shower water.

The waste shower water 31 is preferably heated to 50° C. or more and 100° C. or less with a heater 5a or the like arranged in the evaporator 5. By heating, the water component in the waste shower water 31 is evaporated, and the cleaning liquid components and adhesive components in the waste shower water 31 can be recovered as solids. Thereby, the burden of the waste water treatment can be reduced. Since the aromatic alcohol and the glycol ether generally have a boiling point higher than water, they can be separated and recovered. The boiling point of the aromatic alcohol and the glycol ether is preferably 150° C. or more, more preferably 150 to 300° C.

The aromatic alcohol-based cleaning liquid 10 is not particularly limited, and there can be used an aromatic alcohol/water/surfactant-based cleaning liquid containing an aromatic alcohol, water, and a surfactant, and there can be used a cleaning liquid in which the aromatic alcohol and the surfactant which are active ingredients necessary for cleaning are not easily volatilized or deteriorated in a temperature range of 25° C. or more and 60° C. or less. The water which volatilizes in using the aromatic alcohol-based cleaning liquid may be adjusted by the addition of water.

Examples of the aromatic alcohol include benzyl alcohol, phenethyl alcohol, hydrocinnamyl alcohol, 1-phenyl-1-butanol, phenoxyethanol, phenoxyethanol, and alkyl-substituted derivatives thereof (derivatives in which hydrogen on a benzene ring is replaced with a lower alkyl group, for example, an alkyl group having 1 to 3 carbon atoms). Among these, one or more from the group consisting of benzyl alcohol, phenethyl alcohol, hydrocinnamyl alcohol, and alkyl-substituted derivatives thereof can be suitably used, and benzyl alcohol is more preferred in terms of having high capability of swelling the adhesive components.

Examples of the surfactant include an anionic surfactant, a nonionic surfactant, a cationic surfactant, and an amphoteric surfactant. Among these, an anionic surfactant is preferred from the viewpoint that the anionic surfactant is ionized, shows alkalinity, and has a high cleaning effect. Among the anionic surfactant, an aromatic sulfonic acid or an aromatic sulfonic acid salt is preferred from the viewpoint that it has a large effect. Examples of the aromatic sulfonic acid include cumene sulfonic acid, xylene sulfonic acid, toluenesulfonic acid, and phenolsulfonic acid. Examples of the aromatic sulfonic acid salt include a salt of the aromatic sulfonic acid. Examples of the salt include a sodium salt and an ammonium salt. Among the salts, a sodium salt is preferred from the viewpoint that it has a large effect. Among the aromatic sulfonic acid and the aromatic sulfonic acid salt, xylene sulfonic acid and xylene sulfonate are preferred, and sodium xylene sulfonate is more preferred, from the viewpoint that they have a large effect.

A benzyl alcohol/water/sodium xylene sulfonate-based surfactant system is particularly preferred. The aromatic alcohol-based cleaning liquid 10 of the benzyl alcohol/water/sodium xylene sulfonate-based surfactant system preferably contains 30 to 50% by mass of benzyl alcohol, 30 to 50% by mass of water, and 5 to 20% by mass of a sodium xylene sulfonate-based surfactant.

Next, the glycol ether-based cleaning liquid 11 is not particularly limited, and there can be used a cleaning liquid of a glycol ether/water/surfactant system containing a glycol ether, water, and a surfactant. The water which volatilizes in using the glycol ether-based cleaning liquid 11 may be adjusted by the addition of water.

Examples of the glycol ether include diethylene glycol monobutyl ether, diethylene glycol monomethyl ether, triethylene glycol monomethyl ether, propylene glycol monomethyl ether, 3-methoxy-3-methyl-1-butanol, ethylene glycol monobutyl ether, ethylene glycol monomethyl ether, ethylene glycol monoethyl ether, diethylene glycol monoethyl ether, propylene glycol monobutyl ether, dipropylene glycol monobutyl ether, and ethylene glycol phenyl ether. Among these, one or more from the group consisting of diethylene glycol monobutyl ether, diethylene glycol monomethyl ether, triethylene glycol monomethyl ether, propylene glycol monomethyl ether, and 3-methoxy-3-methyl-1-butanol can be suitably used, and diethylene glycol monobutyl ether is more preferred in terms of increasing the clouding point as a mixture, extending the usable temperature range, and providing a high antiseptic effect, in addition to easy availability thereof.

Examples of the surfactant include an anionic surfactant, a nonionic surfactant, a cationic surfactant, and an amphoteric surfactant. Among these, a nonionic surfactant is preferred from the viewpoint that it is excellent in cleaning effectiveness in low concentration and has a high cleaning effect of adhering oil and fat which is hardly cleaned. The nonionic surfactant preferably includes one or more polyoxyethylene-based surfactants each having an ether structure, and more preferably includes an alkylamine-based surfactant, from the viewpoint that they have a large effect.

The glycol ether-based cleaning liquid 11 is a cleaning liquid containing a glycol ether-based compound. The glycol ether-based cleaning liquid 11 is preferably one or more from the group consisting of a diethylene glycol monobutyl ether/polyoxyethylene alkyl ether/water system, a diethylene glycol monobutyl ether/polyoxyethylene alkyl ether/polyoxyethylene alkyl amine/water system, a diethylene glycol monobutyl ether/polyoxyethylene alkyl phenyl ether/water system, and a diethylene glycol monobutyl ether/polyoxyethylene alkyl phenyl ether/polyoxyethylene alkyl amine/water system, more preferably a diethylene glycol monobutyl ether/polyoxyethylene alkyl phenyl ether/water system and a diethylene glycol monobutyl ether/polyoxyethylene alkyl ether/polyoxyethylene alkyl amine/water system, most preferably a diethylene glycol monobutyl ether/polyoxyethylene alkyl ether/polyoxyethylene alkyl amine/water system.

The alkyl preferably has 1 to 20 carbon atoms. In the case of polyoxyethylene alkyl ether or polyoxyethylene alkyl phenyl ether, the alkyl preferably has 2 to 16 carbon atoms, more preferably 10 to 16 carbon atoms. In the case of polyoxyethylene alkyl amine, the alkyl preferably has 12 to 18 carbon atoms.

Examples of the polyoxyethylene alkyl ether include a compound represented by $RO(CH_2CH_2O)_nH$. For example, R is an alkyl group, and n>0. n is preferably 1 to 150, more preferably 5 to 10. Examples of the polyoxyethylene alkyl ether include pentaethylene glycol monododecyl ether and octaethylene glycol monododecyl ether.

Examples of the polyoxyethylene alkyl amine include a compound represented by $RNH(CH_2CH_2O)_nH$ or $RN((CH_2CH_2O)_xH)(CH_2CH_2O)_yH)$. For example, R is an alkyl group, and n>0, x>0, and y>0. n, x, and y are preferably 1 to 150, more preferably 1 to 10. Examples of the polyoxyethylene alkyl amine include polyoxyethylene lauryl amine, polyoxyethylene myristyl amine, polyoxyethylene palmityl amine, and polyoxyethylene stearyl amine.

When the glycol ether-based cleaning liquid is a diethylene glycol monobutyl ether/polyoxyethylene alkyl ether and/or polyoxyethylene alkyl phenyl ether/water system, the glycol ether-based cleaning liquid preferably contains 4.5 to 95% by mass of diethylene glycol monobutyl ether, 0 to 25% by mass of polyoxyethylene alkyl ether and/or polyoxyethylene alkyl phenyl ether, and 0.5 to 91% by mass of water. When the glycol ether-based cleaning liquid is a diethylene glycol monobutyl ether/polyoxyethylene alkyl ether and/or polyoxyethylene alkyl phenyl ether/polyoxyethylene alkyl amine/water system, the glycol ether-based cleaning liquid more preferably contains 3 to 15% by mass of diethylene glycol monobutyl ether, 2 to 15% by mass of polyoxyethylene alkyl ether, 2 to 15% by mass of polyoxyethylene alkyl amine, and 35 to 87% by mass of water, and more preferably contains 4.5 to 10% by mass of diethylene glycol monobutyl ether, 4 to 10% by mass of polyoxyethylene alkyl ether, 4 to 10% by mass of polyoxyethylene alkyl amine, and 55 to 84.5% by mass of water.

EXAMPLES

Hereinafter, the present invention will be further described with reference to Examples, but the present invention is not limited to these.

Experimental Examples

A glass sheet obtained by separation of the following glass laminate was used as a rigid substrate laminate. Plate glass with a plating pattern each having a dimension of 530 mm in width×420 mm in length×0.7 mm in thickness was used as the plate glass. Unless otherwise indicated, experiments were performed at 23° C. and a humidity of 50%.

Experimental Example 1

As an adhesive (I), an ultraviolet-curable acrylic adhesive for temporary fixing (I) was prepared by mixing the following components (A) to (E):
(A) as a polyfunctional (meth)acrylate, 20 parts by mass of "UV-3000B" manufactured by The Nippon Synthetic Chemical Industry Co., Ltd. (urethane acrylate, hereinafter abbreviated as "UV-3000B", in which the weight average molecular weight is 18000; the polyol compound is polyester polyol; the organic polyisocyanate compound is isophorone diisocyanate; and the hydroxy(meth)acrylate is 2-hydroxyethyl acrylate), and 15 parts by mass of dicyclopentanyl diacrylate ("KAYARAD R-684" manufactured by Nippon Kayaku Co., Ltd., hereinafter abbreviated as "R-684");
(B) as a monofunctional (meth)acrylate, 50 parts by mass of 2-(1,2-cyclohexacarboxylmide)ethyl acrylate ("Aronix M-140" manufactured by Toagosei Co., Ltd., hereinafter abbreviated as "M-140"), and 15 parts by mass of phenol 2-mol ethylene oxide-modified acrylate ("Aronix M-101A" manufactured by Toagosei Co., Ltd.);
(C) as a photopolymerization initiator, 8 parts by mass of benzyl dimethyl ketal ("IRGACURE 651" manufactured by BASF SE), hereinafter abbreviated as "BDK";
(D) as particulate matter, 1 part by mass of spherical crosslinked polystyrene particles having an average particle size of 100 μm ("GS-100S" manufactured by Ganz Chemical Co., Ltd.); and
(E) as a polymerization inhibitor, 0.1 parts by mass of 2,2-methylene-bis(4-methyl-6-tertiarybutylphenol) ("Sumilizer MDP-S" manufactured by Sumitomo Chemical Co., Ltd., hereinafter abbreviated as "MDP").

The curing conditions are as follows. The amount of UV (ultraviolet) irradiation in the curing of the adhesive (I) was 2000 mJ/cm$^2$ (as measured with an integrated illuminance meter using a 365-nm photodetector), and the UV irradiation time was 20 seconds.

The plate glass was successively bonded with the adhesive, and a plate glass laminate consisting of 12 sheets of plate glass was produced. The plate glass laminate was divided into a rectangular parallelepiped shape having a size of 47.6 mm in width×108 mm in length×9.55 mm in thickness using a disk cutter (diamond disk).

The divided plate glass laminates were immersed in hot water at 85° C. and separated to obtain a large number of plate-shaped glass.

The glass 21 was cleaned using the apparatus shown in the Figure while shaking the glass up and down under the conditions shown in Table 1 and according to the following order, and the cleaning effect was measured. The cleaning was performed to the containing shelf 22 in which 20 glass sheets were kept in parallel at equal intervals of 10 mm and stored. Five glass-containing shelves 22 were used (the number of cleaned glass is 100).
(1) A step of immersing the rigid substrate laminate bonded with the adhesive in an aromatic alcohol-based cleaning liquid (50% by mass of benzyl alcohol, 35% by mass of water, 15% by mass of sodium xylenesulfonate-based surfactant);
(2) A step of cleaning to remove the adhesive on the rigid substrate by ultrasonic oscillation while keeping the state where the rigid substrate is immersed in the step (1);
(3) A step of subsequently immersing the rigid substrate laminate in a glycol ether-based cleaning liquid (4.5% by mass of diethylene glycol monobutyl ether, 5.5% by mass of polyoxyethylene lauryl phenyl ether (n=9 to 10), and 90% by mass of water);
(4) A step of rinsing off the aromatic alcohol-based cleaning liquid adhering to the rigid substrate by ultrasonic oscillation while keeping the state where the rigid substrate is immersed in the step (3); and
(5) A step of subsequently rinsing off the glycol ether-based cleaning liquid and aromatic alcohol-based cleaning liquid adhering to the rigid substrate with shower water.

The cleaning effect is shown in Table 1 as follows. The appearance of the cleaned glass was visually observed. Among 100 cleaned glass sheets, the number of glass sheets on the surface of which the cleaning liquid or adhesive components did not remain on the surface of the glass was described.

TABLE 1

| | | Adhesive (I) | | | | | |
|---|---|---|---|---|---|---|---|
| | | Experimental Example 1-1 | Experimental Example 1-2 | Experimental Example 1-3 | Experimental Example 1-4 | Experimental Example 1-5 | Experimental Example 1-6 |
| Aromatic alcohol-based cleaner tank | Temperature (° C.) | 20 | 25 | 35 | 50 | 60 | 70 |
| | Frequency (kHz) | | | | 30 | | |
| Glycol ether-based cleaner tank | Temperature (° C.) | | | | 40 | | |
| | Frequency (kHz) | | | | 40 | | |
| Cleaning effect | | 55/100 | 82/100 | 93/100 | 98/100 | 78/100 | 65/100 |
| Remarks | | Comparative Example | Example | Example | Example | Example | Comparative Example |

TABLE 1-continued

| | | Adhesive (I) | | | | | |
|---|---|---|---|---|---|---|---|
| | | Experimental Example 1-7 | Experimental Example 1-8 | Experimental Example 1-9 | Experimental Example 1-10 | Experimental Example 1-11 | Experimental Example 1-12 |
| Aromatic alcohol-based cleaner tank | Temperature (° C.) | | | | 40 | | |
| | Frequency (kHz) | | | | 30 | | |
| Glycol ether-based cleaner tank | Temperature (° C.) | 20 | 25 | 35 | 50 | 60 | 70 |
| | Frequency (kHz) | | | | 40 | | |
| Cleaning effect | | 60/100 | 88/100 | 95/100 | 99/100 | 89/100 | 69/100 |
| Remarks | | Comparative Example | Example | Example | Example | Example | Comparative Example |

The cleaning effect is expressed as (the number of glass sheets in which the cleaning liquid or adhesive components did not remain on the surface)/(the number of cleaned glass sheet).

As shown in the above Table 1, it has been found that, in removing the ultraviolet-curable acrylic adhesive components for temporary fixing adhering to glass, the glass can be cleaned with high cleaning effectiveness by selecting the ultrasonic frequency while controlling the temperature of the cleaning liquid.

It was able to recover the cleaning liquid and adhesive components as solids by heating waste shower water to 80° C. to evaporate water in the waste shower water.

Experimental Example 2

Experimental Example 2 was performed in the same manner as in Experimental Example 1 except that an adhesive (II) was used instead of the adhesive (I). The adhesive (II) was prepared by mixing a two-part room temperature-curable acrylic adhesive for temporary fixing CT-2026 A/B manufactured by Kaken Tech Co., Ltd. in a ratio of A-agent: B-agent=1:1 (mass ratio). The curing conditions of the adhesive (II) were as follows. The environmental temperature in the curing was 25° C., and the time was 60 minutes.

The cleaning effect is shown in Table 2 as follows.

TABLE 2

| | | Adhesive (II) | | | | | |
|---|---|---|---|---|---|---|---|
| | | Experimental Example 2-1 | Experimental Example 2-2 | Experimental Example 2-3 | Experimental Example 2-4 | Experimental Example 2-5 | Experimental Example 2-6 |
| Aromatic alcohol-based cleaner tank | Temperature (° C.) | 20 | 25 | 35 | 50 | 60 | 70 |
| | Frequency (kHz) | | | | 30 | | |
| Glycol ether-based cleaner tank | Temperature (° C.) | | | | 40 | | |
| | Frequency (kHz) | | | | 40 | | |
| Cleaning effect | | 46/100 | 73/100 | 84/100 | 87/100 | 66/100 | 51/100 |
| Remarks | | Comparative Example | Example | Example | Example | Example | Comparative Example |
| | | Experimental Example 2-7 | Experimental Example 2-8 | Experimental Example 2-9 | Experimental Example 2-10 | Experimental Example 2-11 | Experimental Example 2-12 |
| Aromatic alcohol-based cleaner tank | Temperature (° C.) | | | | 40 | | |
| | Frequency (kHz) | | | | 30 | | |
| Glycol ether-based cleaner tank | Temperature (° C.) | 20 | 25 | 35 | 50 | 60 | 70 |
| | Frequency (kHz) | | | | 40 | | |
| Cleaning effect | | 51/100 | 80/100 | 89/100 | 89/100 | 81/100 | 60/100 |
| Remarks | | Comparative Example | Example | Example | Example | Example | Comparative Example |

The cleaning effect is expressed as (the number of glass sheets in which the cleaning liquid or adhesive components did not remain on the surface)/(the number of cleaned glass sheet).

As shown in the above Table 2, it has been found that, in removing the room temperature-curable acrylic adhesive components adhering to glass, the glass can be cleaned with high cleaning effectiveness by selecting the ultrasonic frequency while controlling the temperature of the cleaning liquid. However, the cleaning effect of the adhesive (I) was higher.

Experimental Example 3

Experimental Example 3 was performed in the same manner as in Experimental Example 1 except that an adhesive (III) was used instead of the adhesive (I). The adhesive (III) was prepared by mixing CT-2450M (base resin) and CT-2451H (curing agent) of an epoxy-based adhesive for temporary fixing manufactured by Kaken Tech Co., Ltd. The amount of the curing agent used is 1 equivalent in terms of the active hydrogen equivalent of the curing agent relative to 1 equivalent of the epoxy groups of the epoxy resin. The curing conditions of the adhesive (III) were as follows. The environmental temperature in the curing of the adhesive (III) was 50° C., and the time was 60 minutes.

The cleaning effect is shown in Table 3 as follows.

(A) as a polyfunctional (meth)acrylate, 20 parts by mass of "UV-3000B" manufactured by The Nippon Synthetic Chemical Industry Co., Ltd. (urethane acrylate, hereinafter abbreviated as "UV-3000B"), and 25 parts by mass of dicyclopentanyl diacrylate ("KAYARAD R-684" manufactured by Nippon Kayaku Co., Ltd., hereinafter abbreviated as "R-684");

(B) as a monofunctional (meth)acrylate, 35 parts by mass of 2-hydroxy-3-phenoxypropyl acrylate ("Aronix M-5700" manufactured by Toagosei Co., Ltd., hereinafter abbreviated as "M-5700"), and 20 parts by mass of phenol 2-mol

TABLE 3

| | | Adhesive (III) | | | | | |
|---|---|---|---|---|---|---|---|
| | | Experimental Example 3-1 | Experimental Example 3-2 | Experimental Example 3-3 | Experimental Example 3-4 | Experimental Example 3-5 | Experimental Example 3-6 |
| Aromatic alcohol-based cleaner tank | Temperature (° C.) | 20 | 25 | 35 | 50 | 60 | 70 |
| | Frequency (kHz) | | | | 30 | | |
| Glycol ether-based cleaner tank | Temperature (° C.) | | | | 40 | | |
| | Frequency (kHz) | | | | 40 | | |
| Cleaning effect | | 45/100 | 64/100 | 75/100 | 66/100 | 54/100 | 40/100 |
| Remarks | | Comparative Example | Example | Example | Example | Example | Comparative Example |

| | | Experimental Example 3-7 | Experimental Example 3-8 | Experimental Example 3-9 | Experimental Example 3-10 | Experimental Example 3-11 | Experimental Example 3-12 |
|---|---|---|---|---|---|---|---|
| Aromatic alcohol-based cleaner tank | Temperature (° C.) | | | | 40 | | |
| | Frequency (kHz) | | | | 30 | | |
| Glycol ether-based cleaner tank | Temperature (° C.) | 20 | 25 | 35 | 50 | 60 | 70 |
| | Frequency (kHz) | | | | 40 | | |
| Cleaning effect | | 41/100 | 71/100 | 80/100 | 79/100 | 72/100 | 58/100 |
| Remarks | | Comparative Example | Example | Example | Example | Example | Comparative Example |

The cleaning effect is expressed as (the number of glass sheets in which the cleaning liquid or adhesive components did not remain on the surface)/(the number of cleaned glass sheet).

As shown in the above Table 3, it has been found that, in removing the two-part curable epoxy adhesive components adhering to glass, the glass can be reliably cleaned by selecting the ultrasonic frequency while controlling the temperature of the cleaning liquid. However, the cleaning effect of the adhesive (I) and adhesive (II) was higher.

Experimental Example 4

Experimental Example 4 was performed in the same manner as in Experimental Example 1 except that an adhesive (IV) was used instead of the adhesive (I).

As the adhesive (IV), an ultraviolet-curable acrylic adhesive for temporary fixing (IV) was prepared by mixing the following components (A) to (E):

ethylene oxide-modified acrylate ("Aronix M-101A" manufactured by Toagosei Co., Ltd.);

(C) as a photopolymerization initiator, 10 parts by mass of benzyl dimethyl ketal ("IRGACURE 651" manufactured by BASF SE), hereinafter abbreviated as "BDK");

(D) as particulate matter, 1 part by mass of spherical crosslinked polystyrene particles having an average particle size of 100 ("GS-100S" manufactured by Ganz Chemical Co., Ltd.); and (E) as a polymerization inhibitor, 0.1 parts by mass of 2,2-methylene-bis(4-methyl-6-tertiarybutylphenol) ("Sumilizer MDP-S" manufactured by Sumitomo Chemical Co., Ltd., hereinafter abbreviated as "MDP").

The cleaning effect is shown in Table 4 as follows.

TABLE 4

| | | Adhesive (IV) | | | | | |
|---|---|---|---|---|---|---|---|
| | | Experimental Example 4-1 | Experimental Example 4-2 | Experimental Example 4-3 | Experimental Example 4-4 | Experimental Example 4-5 | Experimental Example 4-6 |
| Aromatic alcohol- | Temperature (° C.) | 20 | 25 | 35 | 50 | 60 | 70 |

TABLE 4-continued

| | | \multicolumn{6}{c}{Adhesive (IV)} | | | | | |
|---|---|---|---|---|---|---|---|
| based cleaner tank | Frequency (kHz) | | | | 30 | | |
| Glycol ether-based cleaner tank | Temperature (° C.) | | | | 40 | | |
| | Frequency (kHz) | | | | 40 | | |
| Cleaning effect | | 56/100 | 81/100 | 94/100 | 97/100 | 77/100 | 63/100 |
| Remarks | | Comparative Example | Example | Example | Example | Example | Comparative Example |

| | | Experimental Example 4-7 | Experimental Example 4-8 | Experimental Example 4-9 | Experimental Example 4-10 | Experimental Example 4-11 | Experimental Example 4-12 |
|---|---|---|---|---|---|---|---|
| Aromatic alcohol-based cleaner tank | Temperature (° C.) | | | | 40 | | |
| | Frequency (kHz) | | | | 30 | | |
| Glycol ether-based cleaner tank | Temperature (° C.) | 20 | 25 | 35 | 50 | 60 | 70 |
| | Frequency (kHz) | | | | 40 | | |
| Cleaning effect | | 61/100 | 89/100 | 96/100 | 98/100 | 90/100 | 68/100 |
| Remarks | | Comparative Example | Example | Example | Example | Example | Comparative Example |

The cleaning effect is expressed as (the number of glass sheets in which the cleaning liquid or adhesive components did not remain on the surface)/(the number of cleaned glass sheet).

As shown in the above Table 4, it has been found that, in removing the ultraviolet-curable acrylic adhesive for temporary fixing adhering to glass, the glass can be cleaned with high cleaning effectiveness by selecting the ultrasonic frequency while controlling the temperature of the cleaning liquid. The cleaning effect was the same as in the case of the adhesive (I).

It was able to recover the cleaning liquid and adhesive components as solids by heating waste shower water to 80° C. to evaporate water in the waste shower water.

Experimental Example 5

Experimental Example 5 was performed in the same manner as in Experimental Example 1 except that a glycol ether-based cleaning liquid (II) (4.5% by mass of diethylene glycol monobutyl ether, 5.5% by mass of pentaethylene glycol monododecyl ether, 5.5% by mass of polyoxyethylene lauryl amine, and 84.5% by mass of water) was used instead of the glycol ether-based cleaning liquid (I).

The cleaning effect is shown in Table 5 as follows.

As shown in Table 5, it has been found that, in removing the ultraviolet-curable acrylic adhesive for temporary fixing adhering to glass, the glass can be cleaned with high cleaning effectiveness by using the glycol ether-based cleaning liquid containing polyoxyethylene alkyl amine. The cleaning effect was higher than that of the glycol ether-based cleaning liquid (I).

It was able to recover the cleaning liquid and adhesive components as solids by heating waste shower water to 80° C. to evaporate water in the waste shower water.

TABLE 5

| | | \multicolumn{6}{c}{Adhesive (I)} | | | | | |
|---|---|---|---|---|---|---|---|
| | | Experimental Example 5-1 | Experimental Example 5-2 | Experimental Example 5-3 | Experimental Example 5-4 | Experimental Example 5-5 | Experimental Example 5-6 |
| Aromatic alcohol-based cleaner tank | Temperature (° C.) | 20 | 25 | 35 | 50 | 60 | 70 |
| | Frequency (kHz) | | | | 30 | | |
| Glycol ether based cleaner tank | Temperature (° C.) | | | | 40 | | |
| | Frequency (kHz) | | | | 40 | | |
| Cleaning effect | | 56/100 | 84/100 | 96/100 | 97/100 | 81/100 | 67/100 |
| Remarks | | Comparative Example | Example | Example | Example | Example | Comparative Example |

| | | Experimental Example 5-7 | Experimental Example 5-8 | Experimental Example 5-9 | Experimental Example 5-10 | Experimental Example 5-11 | Experimental Example 5-12 |
|---|---|---|---|---|---|---|---|
| Aromatic alcohol- | Temperature (° C.) | | | | 40 | | |

TABLE 5-continued

Adhesive (I)

| | | | | | | | |
|---|---|---|---|---|---|---|---|
| based cleaner tank | Frequency (kHz) | | | 30 | | | |
| Glycol ether based cleaner tank | Temperature (° C.) | 20 | 25 | 35 | 50 | 60 | 70 |
| | Frequency (kHz) | | | 40 | | | |
| Cleaning effect | | 62/100 | 91/100 | 97/100 | 99/100 | 93/100 | 70/100 |
| Remarks | | Comparative Example | Example | Example | Example | Example | Comparative Example |

The cleaning effect is expressed as (the number of glass sheets in which the cleaning liquid or adhesive components did not remain on the surface)/(the number of cleaned glass sheet).

Experimental Example 6

Experimental Example 6 was performed in the same manner as in Experimental Example 4 except that the glycol ether-based cleaning liquid (II) (4.5% by mass of diethylene glycol monobutyl ether, 5.5% by mass of pentaethylene glycol monododecyl ether, 5.5% by mass of polyoxyethylene lauryl amine, and 84.5% by mass of water) was used instead of the glycol ether-based cleaning liquid (I).

The cleaning effect is shown in Table 6 as follows.

As shown in Table 6, it has been found that, in removing the ultraviolet-curable acrylic adhesive for temporary fixing adhering to glass, the glass can be cleaned with high cleaning effectiveness by using the glycol ether-based cleaning liquid containing polyoxyethylene alkyl amine. The cleaning effect was higher than that of the glycol ether-based cleaning liquid (I).

It was able to recover the cleaning liquid and adhesive components as solids by heating waste shower water to 80° C. to evaporate water in the waste shower water.

TABLE 6

Adhesive (IV)

| | | Experimental Example 6-1 | Experimental Example 6-2 | Experimental Example 6-3 | Experimental Example 6-4 | Experimental Example 6-5 | Experimental Example 6-6 |
|---|---|---|---|---|---|---|---|
| Aromatic alcohol-based cleaner tank | Temperature (° C.) | 20 | 25 | 35 | 50 | 60 | 70 |
| | Frequency (kHz) | | | | 30 | | |
| Glycol ether-based cleaner tank | Temperature (° C.) | | | | 40 | | |
| | Frequency (kHz) | | | | 40 | | |
| Cleaning effect | | 57/100 | 84/100 | 96/100 | 98/100 | 80/100 | 64/100 |
| Remarks | | Comparative Example | Example | Example | Example | Example | Comparative Example |

| | | Experimental Example 6-7 | Experimental Example 6-8 | Experimental Example 6-9 | Experimental Example 6-10 | Experimental Example 6-11 | Experimental Example 6-12 |
|---|---|---|---|---|---|---|---|
| Aromatic alcohol-based cleaner tank | Temperature (° C.) | | | | 40 | | |
| | Frequency (kHz) | | | | 30 | | |
| Glycol ether-based cleaner tank | Temperature (° C.) | 20 | 25 | 35 | 50 | 60 | 70 |
| | Frequency (kHz) | | | | 40 | | |
| Cleaning effect | | 62/100 | 91/100 | 97/100 | 98/100 | 93/100 | 69/100 |
| Remarks | | Comparative Example | Example | Example | Example | Example | Comparative Example |

The cleaning effect is expressed as (the number of glass sheets in which the cleaning liquid or adhesive components did not remain on the surface)/(the number of cleaned glass sheet).

The present invention can clean a rigid substrate by using an aromatic alcohol-based cleaning liquid effective for removing an adhesive and by oscillating ultrasonic waves.

The present invention can suppress the discharge of an aromatic alcohol-based cleaning liquid having high BOD and COD by dispersing and recovering the aromatic alcohol-based cleaning liquid in a glycol ether-based cleaning liquid. The present invention makes it possible to rinse off a glycol ether-based cleaning liquid having high compatibility with water with a small amount of water. The present invention can recover a cleaning liquid and an adhesive each having high BOD and COD as a solid phase by recovering the cleaning liquid and then evaporating water.

For example, when a printing pattern, a plating pattern, or the like through which UV light cannot easily transmit is applied to the surface of glass, an adhesive adjacent to the patterned part has high adhesion to glass, and even if the adhesive and the glass laminate are separated, the adhesive components tend to remain on the surface of glass. The present invention can remove the adhesive components on the surface of glass together with the cleaning liquid, even if a printing pattern, a plating pattern, or the like through which UV light cannot easily transmit is applied to the surface of glass. The industrial availability of the present invention is extremely high.

REFERENCE SIGNS LIST

1 Ultrasonic Cleaning Tank
1a Ultrasonic Oscillator
2 Ultrasonic Cleaning Tank
2a Ultrasonic Oscillator
3 Shower Cleaning Tank
3a Shower
4 Storage Tank
5 Evaporator
5a Heater
10 Aromatic Alcohol-based Cleaning Liquid
11 Glycol Ether-based Cleaning Liquid
21 Rigid Substrate
22 Containing Shelf
31 Waste Shower Water Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. An apparatus for cleaning a rigid substrate having an adhesive adhering to a surface thereof, the apparatus comprising:

a first cleaning liquid tank for cleaning a rigid substrate having an adhesive adhering to a surface thereof, the first cleaning liquid tank contains a first cleaning liquid including an aromatic alcohol at 25 to 60° C. and being equipped with an ultrasonic oscillator;

a second cleaning liquid tank for rinsing off the first cleaning liquid adhering to the rigid substrate, the second cleaning liquid tank being installed downstream of the first cleaning liquid tank, the second cleaning liquid tank contains a second cleaning liquid including a glycol ether at 25 to 60° C., and being equipped with an ultrasonic oscillator; and a water washing chamber for rinsing off the second and first cleaning liquid adhering to the rigid substrate with water, the chamber being installed downstream of the second cleaning liquid tank, and wherein the first cleaning liquid includes of benzyl alcohol, water, and sodium xylenesulfonate-based surfactant, and wherein the second cleaning liquid includes diethylene glycol monobutyl ether, polyoxyethylene lauryl phenyl ether, and water, or of diethylene glycol monobutyl ether, pentaethylene glycol monododecyl ether, polyoxyethylene lauryl amine, and water.

2. The apparatus according to claim 1, wherein the apparatus further comprises an evaporator for evaporating water contained in a waste liquid from the water washing chamber.

3. The apparatus according to claim 2, wherein the apparatus further comprises a storage tank for storing the waste liquid from the water washing chamber, the storage tank being installed between the water washing chamber and the evaporator.

4. The apparatus according to claim 1, wherein the second cleaning liquid and the first cleaning liquid adhering to the rigid substrate are rinsed off with shower water.

5. The apparatus according to claim 1, wherein
the adhesive is a photocurable (meth)acrylic adhesive.

* * * * *